(12) United States Patent
Tezaur

(10) Patent No.: US 8,687,909 B2
(45) Date of Patent: Apr. 1, 2014

(54) METHOD FOR DEBLURRING AN IMAGE THAT PRODUCES LESS RINGING

(75) Inventor: Radka Tezaur, Mountain View, CA (US)

(73) Assignee: Nikon Corporation, Tokyo (JP)

( * ) Notice: Subject to any disclaimer, the term of this patent is extended or adjusted under 35 U.S.C. 154(b) by 619 days.

(21) Appl. No.: 12/741,184

(22) PCT Filed: Apr. 16, 2008

(86) PCT No.: PCT/US2008/004895
§ 371 (c)(1),
(2), (4) Date: May 3, 2010

(87) PCT Pub. No.: WO2009/128798
PCT Pub. Date: Oct. 22, 2009

(65) Prior Publication Data
US 2010/0266218 A1    Oct. 21, 2010

(51) Int. Cl.
*G06K 9/40*    (2006.01)
*G06K 9/20*    (2006.01)

(52) U.S. Cl.
USPC ........... 382/255; 382/254; 382/260; 382/266; 382/275; 382/283

(58) Field of Classification Search
USPC ........................................................ 382/266
See application file for complete search history.

(56) References Cited

U.S. PATENT DOCUMENTS

| | | | |
|---|---|---|---|
| 4,764,015 A | | 8/1988 | Bieringer et al. |
| 4,916,525 A | | 4/1990 | Drummond |
| 5,351,314 A | * | 9/1994 | Vaezi ............................ 382/264 |
| 5,896,469 A | * | 4/1999 | Murakami .................... 382/266 |
| 5,974,174 A | * | 10/1999 | Hozumi ........................ 382/199 |
| 7,826,678 B2 | * | 11/2010 | Lyu et al. ...................... 382/263 |
| 8,139,884 B2 | * | 3/2012 | Chien et al. ................... 382/255 |
| 8,159,552 B2 | * | 4/2012 | Lim et al. .................. 348/222.1 |
| 2004/0200369 A1 | * | 10/2004 | Brady ......................... 101/463.1 |
| 2005/0041842 A1 | * | 2/2005 | Frakes et al. ................. 382/128 |
| 2005/0147313 A1 | | 7/2005 | Gorinevsky |
| 2008/0008472 A1 | | 1/2008 | Dress et al. |

OTHER PUBLICATIONS

M. Bertero and P. Boccacci, A Simple Method for the Reduction of Boundary Effects in the Richardson-Lucy Approach to Image Deconvolution, Mar. 17, 2005, Astronomy and Astrophysics manuscript No. aa2717-05, DISI, University of Genova, Genova Italy.

David S.C. Biggs and M. Andrews, Acceleration of Iterative Image Restoration Algorithms, Mar. 10, 1997, vol. 36, No. 8 pp. 1766-1775, Applied Optics, Optical Society of America, US.

(Continued)

*Primary Examiner* — Michelle Entezari

(74) *Attorney, Agent, or Firm* — Roeder & Broder LLP

(57) ABSTRACT

A method for reducing blurring in a blurred image (14) of a scene (12) includes the steps of: (i) creating an edge mask (362) from the blurred image (14); (ii) extending the edge mask (362; (iii) forming an initial array (e.g. extending the blurred image (360); and (iv) performing Lucy-Richardson iterations, with masking. With the deblurring method disclosed herein, the reconstructed adjusted image (16) (i) does not have (or has significantly less) ringing artifacts around the edges (22) of the captured object(s) (20C), and (ii) does not have (or has significantly less) ringing artifacts around border (24). As a result thereof, the adjusted image (16) is more attractive and more accurately represents the scene (12).

20 Claims, 3 Drawing Sheets

(56) References Cited

OTHER PUBLICATIONS

Robert J. Hanisch et al., Denconvolution of Hubble Space Telescope Images and Spectra, Space Telescope Science Institute, Baltimore, MD, 1997, Chapter 10, pp. 310-361, Deconvolution of Images and Spectra Second Edition, Acadamic Press, Space Telescope Science Institute, Baltimore, Maryland, US.

L.B. Lucy, An Iterative Technique for the Rectification of Observed Images, The Astronomical Journal, 1974, vol. 79: pp. 745-754, University of Chicago, US.

W.H. Richardson, Bayesian-based Iterative Method of Image Restoration, J. Opt. Soc. Am., 1972, vol. 62, pp. 55-59, NW Washington, DC, US.

International Search Report and Written Opinion for PCT/US08/04895, publication date Jul. 18, 2008, Nikon Corporation.

Notification of Transmittal of International Preliminary Report on Patentability for PCT/US2008/04895, publication date Dec. 14, 2010, Nikon Corporation.

\* cited by examiner 451
0.5 0.5 0.5 0.5
0.5 0.5 0.5 0.5
0.5 0.5 0.5 0.5
0.5 0.5 0.5 0.5

453
0.1 0.3 0.9 0.6
0.5 0.2 0.4 0.5
0.4 0.6 0.7 0.8
0.5 0.3 0.1 0.5

METHOD FOR DEBLURRING AN IMAGE THAT PRODUCES LESS RINGING

BACKGROUND

Cameras are commonly used to capture an image of a scene. Unfortunately, some of the captured images are blurred. FIG. 1 is a simplified illustration of a prior art, blurred, captured image 14P of a starfish. In this illustration, the relatively thick lines are used to represent the blurring of the captured image 14P.

A number of different methods exist for deblurring an image. For example, blurring of an image is commonly modeled as convolution and many deconvolution methods exist that can help to reduce blurring. However, most of these methods tend to produce ringing artifacts in the reconstructed image.

One commonly used deconvolution method is the Lucy-Richardson deconvolution method. FIG. 1 also illustrates a prior art reconstructed image 26P that was deconvouted using the Lucy-Richardson method. Although this method works quite well in reducing blurring, the reconstructed image is left with two types of ringing artifacts, namely ringing artifacts around the edges and other boundaries of objects in the image, and ringing artifacts around boundaries of the image (e.g. the image border). As a result thereof, the resulting reconstructed image 26P has ringing artifacts 28P (illustrated with two dashed lines) around the edges 30P of the captured object(s) 20P in the reconstructed image 26P, and has ringing artifacts 32P (illustrated with two dashed lines) around the boundaries 34P of the reconstructed image 26P. The ringing in the reconstructed image 26P typically consists of multiple parallel lines around the object 20P and image edges 34P, with the first line being the strongest and subsequent lines gradually become weaker.

As the result thereof, the corrected image is not completely satisfactory.

SUMMARY

The present invention is directed to a method for reducing blurring in a blurred image. In one embodiment, the method comprising the steps of: (i) creating an edge mask from the blurred image; (ii) extending the edge mask; (iii) forming an initial array (e.g. extending the blurred image); and (iv) performing Lucy-Richardson iterations, with masking. Additionally, this method can include the step of cropping of the extended image so that the reconstructed image is approximately the same size as the blurred image. In certain embodiments, with the deblurring method disclosed herein, the reconstructed adjusted image (i) has significantly less ringing artifacts around the edges of the captured object(s), and (ii) has significantly less ringing artifacts around boundaries. As a result thereof, the adjusted image is more attractive and more accurately represents the scene.

In one embodiment, the step of performing Lucy-Richardson iterations, with masking, is done until a pre-selected stopping criterion is reached.

In another embodiment, the step of performing Lucy-Richardson iterations includes the step of computing a blurred mask $$\alpha(n) = \sum_m h(m, n) M(m).$$

This equation is described in more detail below.

As provided herein, the blurred image and the edge mask can be extended with padding that does not introduce artificial edges. For example, the blurred image can be extended with symmetric reflection and the blurred image can be extended by padding with zeros.

The present invention is also directed to a device for deblurring a blurred image.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 2A:
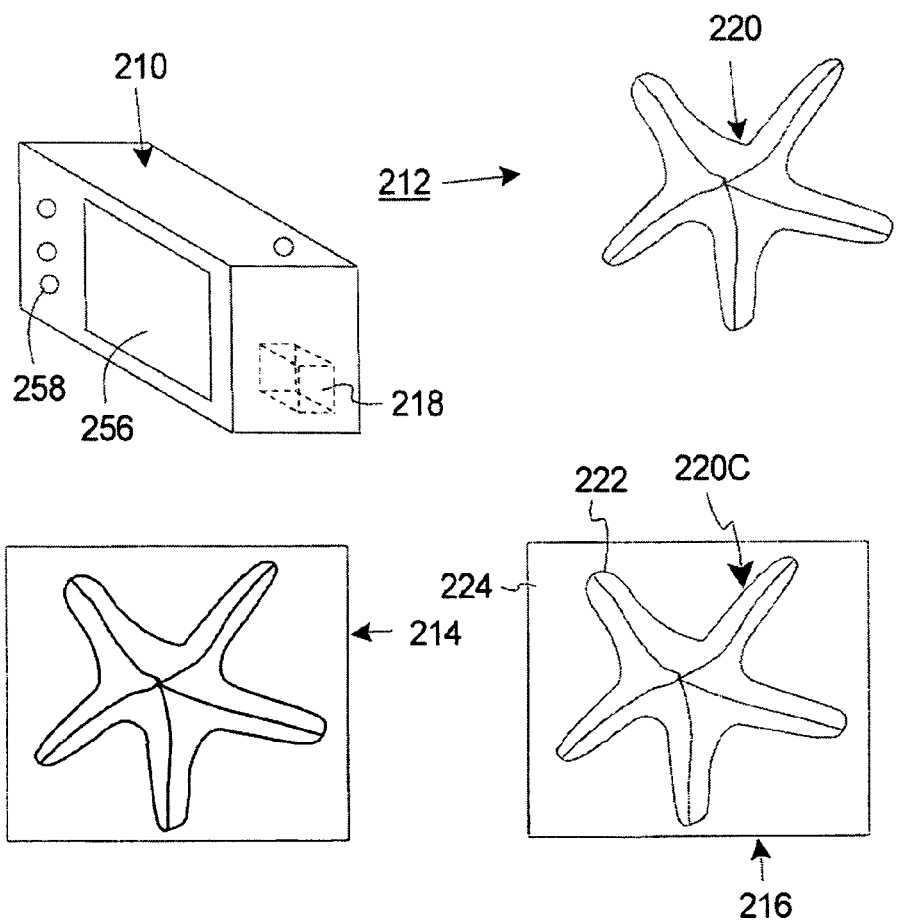
FIG. 2A is a simplified view of a scene, an image apparatus having features of the present invention, a captured blurred image, and an adjusted image.

FIG. 2A is a simplified perspective illustration of an image apparatus 210 having features of the present invention, and a scene 212. The image apparatus 210 (i) captures a raw, blurred (illustrated with thick lines) image 214 (illustrated away from the image apparatus 210), and (ii) provides an adjusted image 216 (illustrated away from the image apparatus 210). In one embodiment, the image apparatus 210 includes a control system 218 (illustrated in phantom) that uses a unique deblurring method on the blurred image 214 to reduce the amount of blur in the generated adjusted image 216. As a result thereof, the adjusted image 216 is more attractive and more accurately represents the scene 212.

The type of scene 212 captured by the image apparatus 210 can vary. For example, the scene 212 can include one or more objects 220, e.g. animals, plants, mammals, and/or environments. For simplicity, in FIG. 2A, the scene 212 is illustrated as including one object 220. Alternatively, the scene 212 can include more than one object 220. In FIG. 2A, the object 220 is a starfish.

It should be noted that with the deblurring method disclosed herein, the reconstructed adjusted image 216 (i) does not have (or has significantly less) ringing artifacts around the edges 222 of the captured object(s) 220C, and (ii) does not have (or has significantly less) ringing artifacts around boundaries 224.

Figure 2B:
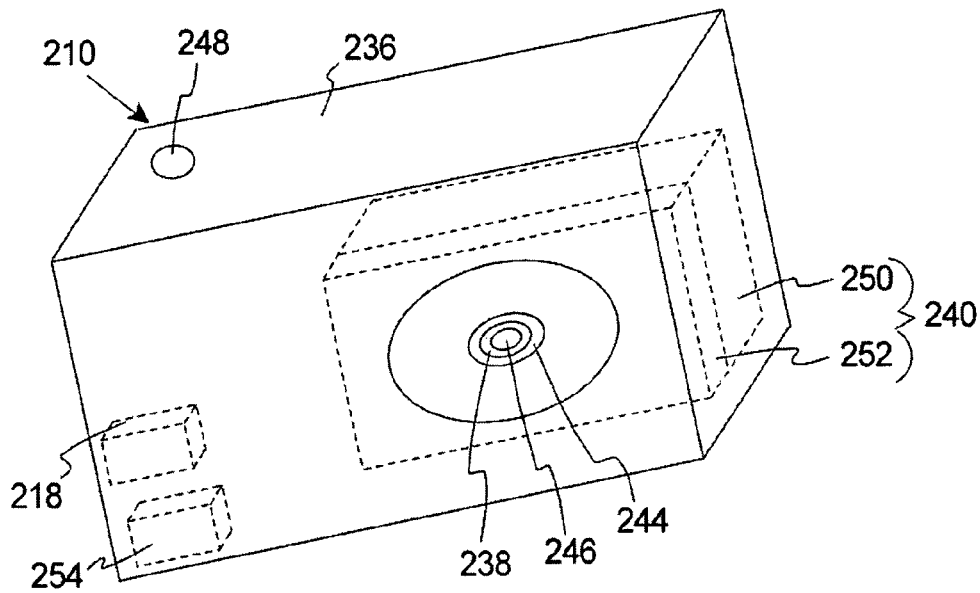
FIG. 2B is a simplified front perspective view of the image apparatus of FIG. 2A.

FIG. 2B illustrates a simplified, front perspective view of one, non-exclusive embodiment of the image apparatus 210. In this embodiment, the image apparatus 210 is a digital camera, and includes an apparatus frame 236, an optical assembly 238, and a capturing system 240 (illustrated as a box in phantom), in addition to the control system 218 (illustrated as a box in phantom). The design of these components can be varied to suit the design requirements and type of image apparatus 210. Further, the image apparatus 210 could be designed without one or more of these components.

The apparatus frame 236 can be rigid and support at least some of the other components of the image apparatus 210. In one embodiment, the apparatus frame 236 includes a generally rectangular shaped hollow body that forms a cavity that receives and retains at least some of the other components of the image apparatus 210.

The apparatus frame 236 can include an aperture 244 and a shutter mechanism 246 that work together to control the amount of light that reaches the capturing system 240. The shutter mechanism 246 can be activated by a shutter button 248. The shutter mechanism 246 can include a pair of blinds (sometimes referred to as "blades") that work in conjunction with each other to allow the light to be focused on the capturing system 240 for a certain amount of time. Alternatively, for example, the shutter mechanism 246 can be all electronic and contain no moving parts. For example, an electronic capturing system 240 can have a capture time controlled electronically to emulate the functionality of the blinds.

The optical assembly 238 can include a single lens or a combination of lenses that work in conjunction with each other to focus light onto the capturing system 240. In one embodiment, the image apparatus 210 includes an autofocus assembly (not shown) including one or more lens movers that move one or more lenses of the optical assembly 238 in or out until the sharpest possible image of the subject is received by the capturing system 240.

The capturing system 240 captures information for the raw image. The design of the capturing system 240 can vary according to the type of image apparatus 210. For a digital type camera, the capturing system 240 includes an image sensor 250 (illustrated in phantom), a filter assembly 252 (illustrated in phantom), and a storage system 254 (illustrated in phantom).

The image sensor 250 receives the light that passes through the aperture 244 and converts the light into electricity. One non-exclusive example of an image sensor 250 for digital cameras is known as a charge coupled device ("CCD"). An alternative image sensor 250 that may be employed in digital cameras uses complementary metal oxide semiconductor ("CMOS") technology.

The image sensor 250, by itself, produces a grayscale image as it only keeps track of the total quantity of the light that strikes the surface of the image sensor 250. Accordingly, in order to produce a full color image, the filter assembly 252 is generally used to capture the colors of the image.

The storage system 254 stores the various raw images (illustrated in FIG. 2A) and/or the adjusted images 16 (illustrated in FIG. 2A) before these images are ultimately printed out, deleted, transferred or downloaded to an auxiliary storage system or a printer. The storage system 254 can be fixedly or removable coupled to the apparatus frame 236. Non-exclusive examples of suitable storage systems 254 include flash memory, a floppy disk, a hard disk, or a writeable CD or DVD.

The control system 218 is electrically connected to and controls the operation of the electrical components of the image apparatus 210. The control system 218 can include one or more processors and circuits, and the control system 218 can be programmed to perform one or more of the functions described herein. In FIG. 2B, the control system 218 is secured to the apparatus frame 236 and the rest of the components of the image apparatus 210. Further, the control system 218 is positioned within the apparatus frame 236.

In certain embodiments, the control system 218 includes software that reduces the blurring in the blurred image 214 to provide the adjusted image 216.

Referring back to FIG. 2A, the image apparatus 210 includes an image display 256 that displays the blurred image 214 and/or the adjusted images 216. With this design, the user can decide which images 214, 216 should be stored and which images 214, 216 should be deleted. In FIG. 2A, the image display 256 is fixedly mounted to the rest of the image apparatus 210. Alternatively, the image display 256 can be secured with a hinge mounting system (not shown) that enables the display 256 to be pivoted. One non-exclusive example of an image display 256 includes an LCD screen.

Further, the image display 256 can display other information that can be used to control the functions of the image apparatus 210.

Moreover, the image apparatus 210 can include one or more control switches 258 electrically connected to the control system 218 that allows the user to control the functions of the image apparatus 210. For example, one or more of the control switches 258 can be used to selectively switch the image apparatus 210 to the blur reduction mode in which the deblurring method disclosed herein is activated.

In this discussion of the new deblurring method, m,n are vectors that denote positions of elements within the 2-D pixel arrays. Multiplication of arrays in formulas is element-wise multiplication, not the matrix product. Similarly, the division of arrays is element-wise division.

A blurred image g that is blurred by a known point spread function ("PSF") h can be expressed as:

$$g(m) = \sum_n h(m,n) f(n), \qquad \text{Eq. 1}$$

in which f represents an ideal, sharp image.

A prior art standard Lucy-Richardson algorithm uses the following iterations to find the approximation of the sharp image f:

$$g^{(k)}(m) = \sum_n h(m,n) f^{(k)}(n), \qquad \text{Eq. 2}$$

$$f^{(k+1)}(n) = \frac{1}{\sum_m h(m,n)} \left( \sum_m h(m,n) \frac{g(m)}{g^k(m)} \right) f^{(k)}(n). \qquad \text{Eq. 3}$$

The iterative process is usually started with an initial guess $f^{(0)}$=constant or $f^{(0)}$=g. Usually, the first term on the right hand side of Equation 3 is omitted because the PSF is commonly normalized to satisfy $$\sum_m h(m,n) = 1 \qquad \text{Eq. 4}$$

to preserve image brightness. Also, the PSF is often assumed to be spatially invariant. As a result thereof, $$h(m,n) = h(m-n) \qquad \text{Eq. 5}$$

and h can be represented by a single 2-D array. The sums in the formulas above then become convolution respectively correlation with the PSF array h (depending whether the summation is over n or m). In this case, a fast implementation of Equations 2 and 3 using FFT (Fast Fourier Transform) is possible:

$$g^{(k)} = F^{-1}HFf^{(k)}, \quad \text{Eq. 6}$$

$$f^{(k+1)} = \left(\frac{F^{-1}H^*F\left(\frac{g}{g^{(k)}}\right)}{u}\right)f^{(k)}, \quad \text{Eq. 7}$$

where F is the Fourier transform operator, H is (discretized) optical transfer function corresponding to the given PSF (the Fourier transform of h padded by zeros and shifted), * denotes complex conjugation, and u is defined by the equation below, $$u = F^{-1}H^*F\underline{1} \quad \text{Eq. 8}$$

where $\underline{1}$ is an array of ones.

Figure 1:
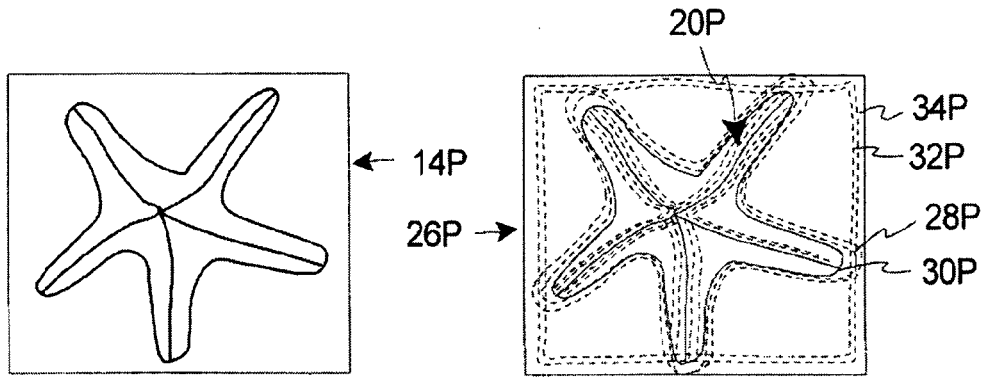
FIG. 1 is a simplified prior art illustration of a captured blurred image and a prior art reconstructed image.

As described above, one of the main problems with the basic Lucy-Richardson algorithm is the unpleasant ringing artifacts that appear in the reconstructed image 26P (illustrated in FIG. 1). Referring back to FIG. 1, with basic Lucy-Richardson method, there are two types of ringing artifacts, namely (i) the ringing 28P around object edges 30P inside the reconstructed image 26P, and (ii) the ringing 32P around image boundaries 34P of the reconstructed image 26P.

One technique that is used with Lucy-Richardson iterations helps to exclude (mask out) bad pixels within the observed image and to eliminate (or reduce) their influence in the reconstructed image. This technique (referred to as "masking method") consists of introducing weights (w(m)) into the algorithm to reduce the influence caused by bad pixels on the reconstructed image. With weights, if the pixel at location m is considered to be bad (for example, because it is know that the sensor has a defect at this particular location), the weight is zero (w(m)=0). Alternatively, if the pixel at location m is considered to be good, the weight is one (w(m) =1). The weight mask inhibits bad pixel values influencing the other pixel values during the deconvolution process. However, the other good pixel values still do influence values in bad pixels. The same masking technique can be used to suppress ringing around object edges. It is accomplished by not allowing pixel values in edge regions to influence pixel values in smooth regions (where the resulting ringing is most visible). That is, the edge pixels are viewed as the "bad" pixels and pixels in the smooth regions are viewed as good pixels. The edge mask can be created using any of many existing edge detection techniques that can identify locations of steep change of image intensity or color.

The resulting formulas for the Lucy-Richardson iterations with masking look as follows:

$$g^{(k)}(m) = \sum_n h(m,n)f^{(k)}(n), \quad \text{Eq. 9}$$

$$f^{(k+1)}(n) = \frac{1}{\sum_m w(m)h(m,n)}\left(\sum_m w(m)h(m,n)\frac{g(m)}{g^{(k)}(m)}\right)f^{(k)}(n). \quad \text{Eq. 10}$$

Basically, Equation 10 is similar to Equation 3, except the weight ("w(m)") has been added to reduce the influence of the bad pixels on the reconstructed image. When the PSF is spatially invariant, the fast implementation using FFT is again possible:

$$g^{(k)} = F^{-1}HFf^{(k)}, \quad \text{Eq. 11}$$

$$f^{(k+1)} = \left(\frac{F^{-1}H^*F\left(w\frac{g}{g^{(k)}}\right)}{\breve{u}}\right)f^{(k)} \quad \text{Eq. 12}$$

$$\breve{u} = F^{-1}H^*Fw. \quad \text{Eq. 13}$$

This masking technique can be used also in combination with other modifications of Lucy-Richardson method, such as damping or acceleration.

Further, in a variation to the masking method described above, rather than only zero ("0") or one ("1"), the weight w(m) assigned to each pixel is allowed to be any number between zero ("0") and one ("1"). In this variation, to suppress the ringing 28P around object edges 30P, pixels at or near edges 30P get a weight of zero (w(m)=0) or close to zero ("0"), while pixels in smooth areas get larger weight (e.g. w(m)=1 or less). However, this method is not designed to and does not reduce ringing artifacts 32P near the image border 34P.

A different algorithm (referred to as "border method") has been developed to reduce ringing artifacts 32P around image border 34P. First, in this algorithm, g is defined as the blurred image padded by zeros ("0's"). Stated in another fashion, the raw blurred image is extended around the border by padding the boundary with zeros ("0's"). Next, an array M is created such that M(m)=1 for pixel locations corresponding to the field of view of the blurred image before it got extended, and M(m)=0 at the locations corresponding to the extension. Next the following Equation is computed $$\alpha(n) = \sum_m h(m,n)M(m). \quad \text{Eq. 14}$$

In Equation 14, α is the blurred mask that results from the blurring of mask M. Subsequently, from the α mask, another mask β is created. More specifically, mask β is the reciprocal of the α mask, except that a small constant σ is chosen and set to prevent division by zero ("0") in Equation 18, $$\beta(n)=1/\alpha(n) \text{ if } \alpha(n)>\sigma, \quad \text{Eq. 15}$$

or $$\beta(n)=0 \text{ otherwise.} \quad \text{Eq. 16}$$

As stated above, in these equations, the β mask is the reciprocal of the α mask.

Subsequently, the algorithm is initialized with $f^{(0)}$=constant.

Next, the following iterations are computed until a given stopping criterion is reached:

$$g^{(k)}(m) = \sum_n h(m,n)f^{(k)}(n), \quad \text{Eq. 17}$$

$$f^{(k+1)}(n) = \beta(n)\left(\sum_m h(m,n)\frac{g(m)}{g^{(k)}(m)}\right)f^{(k)}(n). \quad \text{Eq. 18}$$

Finally, the resulting image is cropped to have the same field of view as the original blurred image. Stated in another fashion, the resulting image is cropped to remove the extended boundary.

If the PSF is spatially invariant, FFT can be used for fast implementation of this method. It can be used to compute both the Lucy-Richardson iterations, $$g^{(k)} = F^{-1}HFf^{(k)} \qquad \text{Eq. 19}$$

$$f^{(k+1)} = \beta\left(F^{-1}H^*F\left(\frac{g}{g^{(k)}}\right)\right)f^{(k)} \qquad \text{Eq. 20}$$

and the array α becomes, $$\alpha = F^{-1}H^*FM. \qquad \text{Eq. 21}$$

As disclosed herein, in one embodiment, the masking method for the suppression of ringing around object edges based on the technique for masking out bad pixels described in Equations 9-13, and the border method for elimination of ringing around image borders described in Equations 17-21 can be combined into a single new method that reduces blurring and both (i) inhibits ringing around object edges, and (ii) inhibits ringing at image borders.

One key to combining both methods is the unique observation that the border method described in Equations 17-21 can be reformulated to use a mask in exactly the same way as the masking method described in Equations 9-13. In the border method, because g is the original image with an extended boundary padded by zeros ("0's"), and M has ones ("1's") in the locations corresponding to the field of view of the original blurred image and zeros ("0's") in the locations corresponding to the extension, $$g = Mg \qquad \text{Eq. 22}$$

As a reminder, the multiplication of arrays here is element-wise, same as in all other formulas in this document. If the additional step is left aside in the border method in which the reciprocal mask β is created to prevent division by 0, then, by using Equation 14 and replacing g(m) by M(m)g(m), Equation 18 (for border method) becomes Equation 10 (for Lucy-Richardson method with masking), in which $$w = M. \qquad \text{Eq. 23}$$

Thus, to combine the both methods, in M, the ones ("1's") marking the field of view of the original blurred image are replaced with an edge mask that has values between 0 and 1. In this design, the pixels that are at or near object edges have weight close to 0, while pixels in smooth areas have weight close to 1. The resulting algorithm is described in more detail below.

Figure 3:
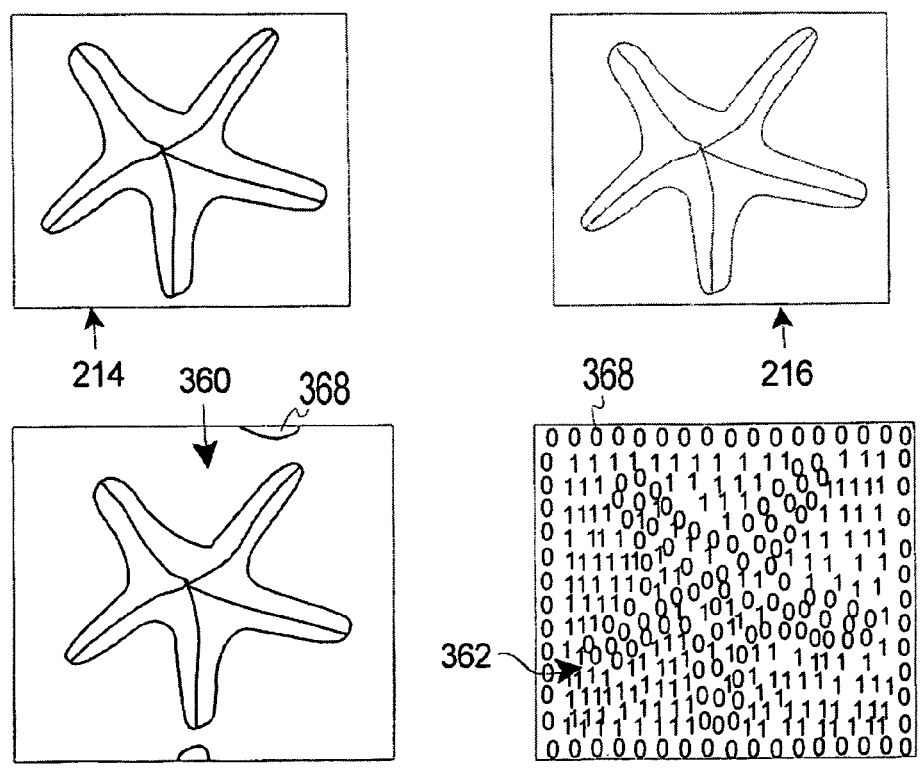
FIG. 3 illustrates the blurred image, an extended blurred image, an extended masked image, and the resulting adjusted image.

FIG. 3 illustrates the blurred image 214, an expanded blurred image 360, an extended edge mask 362 and the resulting adjusted image 216. In the current method, an edge mask M is created from the blurred image 214. In the edge mask M, values in the mask are between 0 and 1. In one embodiment, pixels in smooth regions are assigned relatively high values (i.e. w(m)=1 or values closer to 1 than 0) while pixels in the edge regions get assigned relatively small values (i.e. w(m)=0 or values closer to 0 than 1). In the edge mask 362 illustrated in FIG. 3, for simplicity, only values of 0 and 1 are represented therein. It should be noted that the 1's in FIG. 3 can represent values that are closer to 1 than 0 while the 0's in FIG. 3 can represent values that are closer to 0 than 1. It should also be noted that the edge mask 362 has been extended by padding with zeros ("0's").

Further, the blurred image 214 has been expanded to create the extended blurred image (g) 360. If the blurred image 214 is used as the initial guess for the iterations, padding that does not introduce artificial edges needs to be used. For example, extension 368 of the image by symmetric reflection (as illustrated in FIG. 3) can be used.

Next, compute $$\alpha(n) = \sum_m h(m, n)M(m). \qquad \text{Eq. 24}$$

Where α is the blurred mask that results from the blurring of mask M. Subsequently, mask β is created as the reciprocal of the α mask. A small constant σ is chosen and set to prevent division by zero ("0") in Equation 25

$$\beta(n) = 1/\alpha(n) \text{ if } \alpha(n) > \sigma, \qquad \text{Eq. 25}$$

or $$\beta(n) = 0 \text{ otherwise.} \qquad \text{Eq. 26}$$

Figures 4, 5:
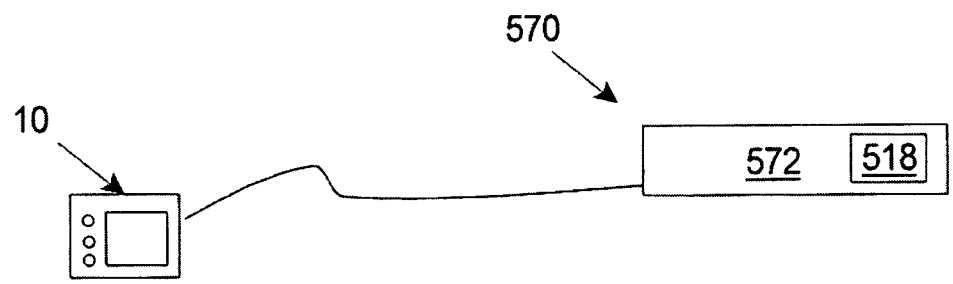
FIG. 4 illustrates a constant array and a random array having features of the present invention.
FIG. 5 is a simplified illustration of another embodiment having features of the present invention.

Chose the initial guess, e.g. an initial array is utilized. For example, the initial array can be generated by extending the blurred image 360 using symmetric reflection or in another fashion that does not introduce artificial edges. Alternatively, the initial array can be a non-zero constant array 451 or a random array 452 as illustrated in FIG. 4. It should be noted that the arrays 451, 453 illustrated in FIG. 4 are merely a small, non-exclusive portion of possible arrays. In any case, the initial array will have the size and shape of the image plus the extension. Thus, for example, $f^{(0)}$=constant, $f^{(0)}$=random variable, or $f^{(0)}$=g with symmetric extension.

Next, the Lucy-Richardson iterations with masking are repeated until a preselected stopping criterion is reached:

$$g^{(k)}(m) = \sum_n h(m, n)f^{(k)}(n), \qquad \text{Eq. 27}$$

$$f^{(k+1)}(n) = \beta(n)\left(\sum_m h(m, n)M(m)\frac{g(m)}{g^{(k)}(m)}\right)f^{(k)}(n). \qquad \text{Eq. 28}$$

Finally, resulting adjust image 216 is cropped to have the same field of view as the original blurred image 14.

This algorithm can also be combined with acceleration and damping techniques for Lucy-Richardson method. If the PSF is spatially invariant, then FFT can be used for fast implementation:

$$g^{(k)} = F^{-1}HFf^{(k)}, \qquad \text{Eq. 29}$$

$$f^{(k+1)} = \beta\left(F^{-1}H^*F\left(M\frac{g}{g^{(k)}}\right)\right)f^{(k)}, \qquad \text{Eq. 30}$$

and α can be computed using Equation 21.

FIG. 5 illustrates another embodiment of a deblurring system 570 having features of the present invention. In this embodiment, the image apparatus 210 again captures the blurred image 214 (illustrated in FIG. 1). However, in this embodiment, the blurred image 214 is transferred to computer 572 (e.g. a personal computer) that includes a computer control system 518 (illustrated in phantom) that uses the deblurring method disclosed herein to deblur the blurred image 214 and provide the adjusted image 316 (illustrated in FIG. 3).

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for reducing blurring in a blurred image, the method comprising the steps of:
   creating an edge mask from the blurred image;
   providing an extended initial array;
   extending the edge mask;
   performing Lucy-Richardson iterations, with masking using the extended edge mask and the extended initial array to create a deblurred image, the step of performing Lucy-Richardson iterations with masking including computing $$f^{(k+1)}(n) = \beta(n)\left(\sum_m h(m,n)M(m)\frac{g(m)}{g^{(k)}(m)}\right)f^{(k)}(n)$$

wherein f represents a sharp image, M is the edge mask, β is a mask, h is a known point spread function, g is the blurred image, and m,n denote positions of elements within a two dimensional pixel array of the blurred image; and
   cropping the deblurred image to remove the extended portions of the deblurred image.

2. The method of claim 1 wherein the step of providing an extended initial array includes the step of extending the blurred image.

3. The method of claim 2 wherein the step of extending the blurred image is done with padding that does not introduce artificial edges.

4. The method of claim 2 wherein the step of extending the blurred image is done with symmetric reflection.

5. The method of claim 1 wherein the step of providing an extended initial array includes generating a constant array.

6. The method of claim 1 wherein the step of providing an extended initial array includes generating a random array.

7. The method of claim 1 wherein the step of extending the edge mask is done by padding with zeros.

8. The method of claim 1 wherein the step of performing Lucy-Richardson iterations, with masking, is done until a pre-selected stopping criterion is reached.

9. A method for reducing blurring in a blurred image, the method comprising the steps of:
   creating an edge mask from the blurred image;
   providing an extended initial array;
   extending the edge mask;
   performing Lucy-Richardson iterations, with masking using the extended edge mask and the extended initial array to create a deblurred image, the step of performing Lucy-Richardson iterations including computing $$\alpha(n) = \sum_m h(m,n)M(m);$$

wherein M is the edge mask, α is a blurred mask that results from the blurring of mask M, h is a known point spread function, and m,n denote positions of elements within a two dimensional pixel array of the blurred image; and
   cropping the deblurred image to remove the extended portions of the deblurred image.

10. A method for reducing blurring in a blurred image, the method comprising the steps of:
    creating an edge mask from the blurred image;
    extending the edge mask;
    providing an extended initial array;
    performing deconvolution iterations, with masking using the extended edge mask and the extended initial array until a pre-selected stopping criterion is reached to create a deblurred image, the step of performing deconvolution iterations with masking including includes computing $$f^{(k+1)}(n) = \beta(n)\left(\sum_m h(m,n)M(m)\frac{g(m)}{g^{(k)}(m)}\right)f^{(k)}(n)$$

wherein f represents a sharp image, M is the edge mask, β is a mask, h is a known point spread function, g is the blurred image, and m,n denote positions of elements within a two dimensional pixel array of the blurred image; and
    cropping the deblurred image to remove the extended portions of the deblurred image.

11. A method for reducing blurring in a blurred image, the method comprising the steps of:
    creating an edge mask from the blurred image;
    extending the edge mask;
    providing an extended initial array;
    performing deconvolution iterations, with masking using the extended edge mask and the extended initial array until a pre-selected stopping criterion is reached to create a deblurred image, the step of performing deconvolution iterations including computing $$\alpha(n) = \sum_m h(m,n)M(m);$$

wherein M is the edge mask, α is a blurred mask that results from the blurring of mask M, h is a known point spread function, and m,n denote positions of elements within a two dimensional pixel array of the blurred image; and
    cropping the deblurred image to remove the extended portions of the deblurred image.

12. The method of claim 11 wherein the step of performing deconvolution iterations includes the step of performing Lucy-Richardson iterations.

13. The method of claim 9 wherein the step of performing Lucy-Richardson iterations, with masking, is done until a pre-selected stopping criterion is reached.

14. The method of claim 9 wherein the step of providing an extended initial array includes the step of extending the blurred image.

15. The method of claim 14 wherein the step of extending the blurred image is done with padding that does not introduce artificial edges.

16. The method of claim 14 wherein the step of extending the blurred image is done with symmetric reflection.

17. The method of claim 9 wherein the step of providing an extended initial array includes generating a constant array.

18. The method of claim 9 wherein the step of providing an extended initial array includes generating a random array.

19. The method of claim 9 wherein the step of extending the edge mask is done by padding with zeros.

20. The method of claim 10 wherein the step of performing deconvolution iterations includes the step of performing Lucy-Richardson iterations.

* * * * *